United States Patent
Lee et al.

(10) Patent No.: US 12,192,573 B1
(45) Date of Patent: Jan. 7, 2025

(54) APPARATUS FOR CONVERTING AND TRANSMITTING HORIZONTAL AND VERTICAL VIDEOS BASED ON MACHINE LEARNING

(71) Applicant: MegaLive, Inc., Hanam-si (KR)

(72) Inventors: Seeyoung Lee, Hwaseong-si (KR); Kyung Doc Yoo, Seongnam-si (KR); Dae Hyun Kim, Seongnam-si (KR); Jang-Ryeol Seong, Yongin-si (KR); Kyounghoon Han, Hanam-si (KR)

(73) Assignee: MEGALIVE, INC., Hanam-si (KR)

( * ) Notice: Subject to any disclaimer, the term of this patent is extended or adjusted under 35 U.S.C. 154(b) by 0 days.

(21) Appl. No.: 18/739,932

(22) Filed: Jun. 11, 2024

(30) Foreign Application Priority Data

Aug. 29, 2023 (KR) .......... 10-2023-0114030

(51) Int. Cl.
| | |
|---|---|
| *H04N 21/44* | (2011.01) |
| *H04N 21/414* | (2011.01) |
| *H04N 21/431* | (2011.01) |
| *H04N 21/4402* | (2011.01) |

(52) U.S. Cl.
CPC ........ *H04N 21/440272* (2013.01); *H04N 21/41407* (2013.01); *H04N 21/4316* (2013.01); *H04N 21/44008* (2013.01)

(58) Field of Classification Search
None
See application file for complete search history.

(56) References Cited

FOREIGN PATENT DOCUMENTS

| | | | |
|---|---|---|---|
| KR | 10-1558419 | 10/2015 | |
| KR | 20200022640 A | * 8/2018 | ......... H04N 21/4316 |
| KR | 10-2020-0022640 | 3/2020 | |

* cited by examiner

*Primary Examiner* — Samira Monshi
(74) *Attorney, Agent, or Firm* — LEX IP MEISTER, PLLC

(57) ABSTRACT

Provided is an apparatus for converting and transmitting horizontal and vertical videos based on machine learning. The apparatus for converting and transmitting horizontal and vertical videos based on machine learning includes a receiver unit which receives a horizontal video taken by a camera from the camera; an object detection unit which detects objects in the received horizontal video by using an object recognition model learned by machine learning; a video segmentation unit which generates a plurality of segmentation videos by using the result detected from the object detection unit; a video synthesis unit which arranges the plurality of segmentation videos to fit the size of a screen of a vertical video and generates a vertical video, wherein the segmentation videos may be videos segmented from the horizontal video including at least one object detected from the object detection unit, videos in which the additional videos are synthesized to videos segmented from the horizontal video to comprise at least one object detected from the object detection unit, or the additional videos.

5 Claims, 12 Drawing Sheets

APPARATUS FOR CONVERTING AND TRANSMITTING HORIZONTAL AND VERTICAL VIDEOS BASED ON MACHINE LEARNING

CROSS-REFERENCE TO RELATED PATENT APPLICATION

This application claims the benefit of Korean Patent Application No. 10-2023-0114030, filed on Aug. 29, 2023, in the Korean Intellectual Property Office, the disclosure of which is incorporated herein in its entirety by reference.

BACKGROUND OF THE INVENTION

1. Field of the Invention

The present invention relates to an apparatus for converting and transmitting horizontal and vertical videos based on machine learning, and more particularly, to an apparatus for converting and transmitting horizontal and vertical videos based on machine learning in which machine learning is used to automatically convert a horizontal video recorded in particular by a camera into a vertical video that is appropriate to be watched on a smartphone, and horizontal and vertical videos are simultaneously transmitted for a viewer to watch selected videos as needed so that a viewer may watch the video that fully fills a screen by using any device.

2. Description of the Related Art

Recently, as the internet use has been rapidly spread and the supply of personal mobile communication terminals has been rapidly increased, watching videos on smartphones are rapidly increasing. However, videos currently transmitted are mostly horizontal videos which have a horizontal length longer than a vertical length, wherein the horizontal videos are appropriate for watching on TVs or monitors and are inconvenient for watching on mobile communication terminals such as smartphones. For example, in order to watch a received video that fully fills the screen of a smartphone, a viewer may rotate the smartphone horizontally for watching. When a viewer watches the received video vertically as smartphones are generally used vertically, the horizontal video needs to be displayed to fit the vertical width of a screen. In this regard, the video may become smaller and unnecessary blank spaces may remain up and down within the video. Also, a vertical video may be recorded by a smartphone in a one-man broadcast to be transmitted. However, excepting the case when a viewer watches the video on a vertically-placed smartphone, when a viewer watches the video by rotating a smartphone horizontally or by using a monitor or a TV, the video may also become smaller and unnecessary blank spaces may remain left and right within the video.

SUMMARY OF THE INVENTION

The present invention provides an apparatus for converting and transmitting horizontal and vertical videos based on machine learning in which machine learning is used to automatically convert a horizontal video recorded by a camera into a vertical video that is appropriate to be watched on a smartphone, and horizontal and vertical videos are simultaneously transmitted for a viewer to watch selected videos as needed so that a viewer may watch the video that fully fills a screen by using any device.

According to an aspect of the present invention, there is provided an apparatus for converting and transmitting horizontal and vertical videos based on machine learning including: a receiver unit which receives a horizontal video taken by a camera from the camera; an object detection unit which detects objects in the received horizontal video by using an object recognition model learned by machine learning; a video segmentation unit which generates a plurality of segmentation videos by using the result detected from the object detection unit; a video synthesis unit which arranges the plurality of segmentation videos to fit the size of a screen of a vertical video and generates a vertical video, wherein the segmentation videos may be videos segmented from the horizontal video including at least one object detected from the object detection unit, videos in which the additional videos are synthesized to videos segmented from the horizontal video to comprise at least one object detected from the object detection unit, or the additional videos.

The object detection unit may calculate the importance of the object detected by using the object recognition model in consideration of the position or the size of the object arranged in the horizontal video, and the video segmentation unit may generate a segmentation position of the horizontal video according to the importance of objects calculated in the object detection unit and generate the segmentation videos.

The additional videos may include subtitles or chat windows inserted into the horizontal video, a Picture In Picture (PIP) videos displayed along with the horizontal video, videos taken by a camera other than the camera that transmits the horizontal video, or videos previously stored in a storage space.

The object recognition model may be a model learned through machine learning to recognize people or things in the horizontal video as objects and to distinguish and recognize backgrounds and the objects.

The apparatus for converting and transmitting horizontal and vertical videos based on machine learning may further include a transmission unit which simultaneously transmits the horizontal video and the vertical video to a viewer's terminal so as to display one of the horizontal video and the vertical video on a screen of the viewer's terminal or transmits the horizontal video or the vertical video to a viewer's terminal in response to a selection signal received from the viewer's terminal.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
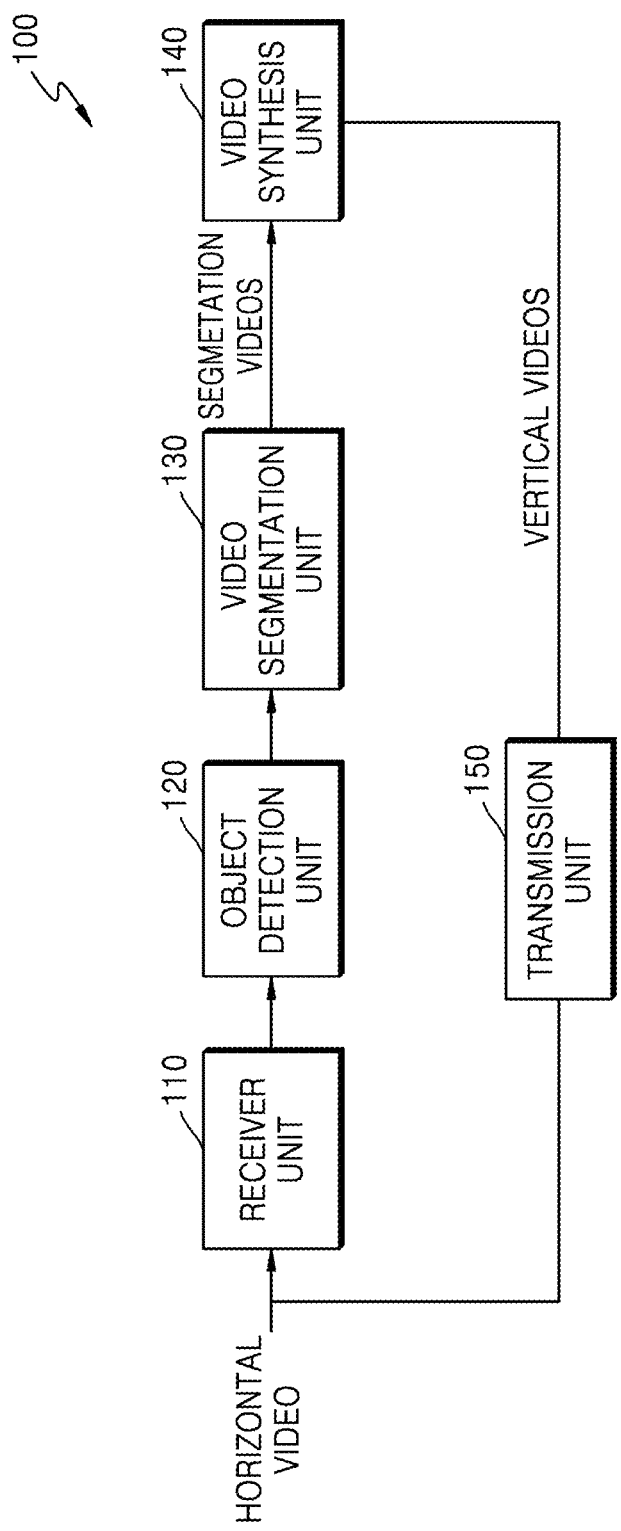
FIG. 1 is a block diagram of an apparatus for converting and transmitting horizontal and vertical videos based on machine learning according to an embodiment of the present invention.

The embodiments of the present invention will be described in detail with reference to the accompanying drawings and description of the drawings so as to fully understand advantages and objectives of the present invention.

Hereinafter, embodiments of the present invention will be described more fully with reference to the accompanying drawings. In the drawings, like reference numerals denote like elements.

FIG. 1 is a block diagram of an apparatus 100 for converting and transmitting horizontal and vertical videos based on machine learning according to an embodiment of the present invention.

Referring to FIG. 1, the apparatus 100 for converting and transmitting horizontal and vertical videos based on machine learning according to an embodiment of the present invention may include a receiver unit 110, an object detection unit 120, a video segmentation unit 130, a video synthesis unit 140, and a transmission unit 150.

The receiver unit 110 may receive a horizontal video taken by a camera from the camera. Also, the object detection unit 120 may detect objects in the received horizontal video by using an object recognition model learned by machine learning. The object recognition model is an artificial intelligence learning model that distinguishes and recognizes objects such as people and things and background and may be a model learned through machine learning by using various learning data. For example, the object recognition model may be a model learned through machine learning so that people or things in the horizontal video may be recognized as objects, and backgrounds and the objects may be distinguished and recognized. Also, the object recognition model may continuously keep learning by using data obtained while the object detection unit 120 is operated.

The video segmentation unit 130 may generate a plurality of segmentation videos by using the result detected from the object detection unit 120. The segmentation videos may include at least one object detected from the object detection unit 120 or may include at least one of additional videos synthesized in the horizontal video. For example, the segmentation videos may be videos segmented from the horizontal video including at least one object detected from the object detection unit 120, videos in which the additional videos are synthesized to videos segmented from the horizontal video, or the additional videos. The additional videos may include subtitles or chat windows synthesized to the horizontal video or may be a Picture In Picture (PIP) videos displayed along with the horizontal video, videos taken by a camera other than the camera that transmits the horizontal video, or videos previously stored in a storage space such as a server or database. When the additional video is synthesized to the videos segmented from the horizontal video in order to generate the segmentation videos, the video segmentation unit 130 may automatically determine a synthetic position of the additional video. In this regard, the video segmentation unit 130 may determine a synthetic position of the additional video by using a module learned by machine learning or with reference to the position where the additional video is inserted or synthesized in the horizontal video.

The video synthesis unit 140 may arrange the plurality of segmentation videos to fit the size of a screen of a vertical video and generate a vertical video. For example, the video segmentation unit 130 may generate a first segmentation video including a part of the plurality of objects in the horizontal video or the additional video and a second segmentation video including remaining objects in the horizontal video or the additional video. The video synthesis unit 140 may generate the vertical video by arranging the first segmentation video and the second segmentation video at the top and the bottom. Here, the video synthesis unit 140 may not always arrange the two segmentation videos at the top and the bottom. Three segmentation videos may be arranged from the top to the bottom to generate a vertical video or a plurality of segmentation videos is arranged under one segmentation video to generate a vertical video. In this regard, if a vertical video may be generated to fit the size of a screen of the vertical video, the segmentation videos may be arranged at various positions.

The transmission unit 150 may simultaneously transmit the horizontal video and the vertical video to a viewer's terminal so as to display one of the horizontal video and the vertical video on a screen or may transmit the horizontal video or the vertical video to a viewer's terminal in response to a selection signal received from the viewer's terminal. For example, when the transmission unit 150 simultaneously transmits the horizontal video and the vertical video to the viewer's terminal, the video is selected and watched from the viewer's terminal. Here, if the viewer's terminal is a mobile terminal such as a smartphone, a built-in sensor may be used to display the horizontal broadcasting on a screen of the mobile terminal placed horizontally and the vertical broadcasting on a screen of the mobile terminal placed vertically. Also, when a selection signal that requests watching the horizontal broadcasting is received from the viewer's terminal, the transmission unit 150 may transmit the horizontal video to the viewer's terminal. When a selection signal that requests watching the vertical broadcasting is received from the viewer's terminal, the transmission unit 150 may transmit the vertical video to the viewer's terminal.

According to an embodiment of the present invention, the object detection unit 120 may calculate the importance of the object detected by using the object recognition model in consideration of the position or the size of the object arranged in the horizontal video. For example, people and things are distinguished in the horizontal video and the importance may be calculated by each object in consideration of the position where people and things are arranged or the size of each of the people and things. As another example, when a plurality of people exists, a person displayed largely on a screen or a person displayed at the center of a screen is distinguished from a person displayed relatively small on a screen or a person displayed at the corner of a screen so that the importance may be calculated differently by each object. In this case, the video segmentation unit 130 may generate a segmentation position of the horizontal video according to the importance of objects calculated in the object detection unit 120 and may generate the segmentation videos. For example, when 5 people are recognized, wherein two people at the center are displayed largely and the other three people are displayed small at the back, a video including two people at the center may be displayed as one segmentation video and a video including people having relatively high importance from among the other three people may be generated as another one segmentation video. As another example, when various objects including show hosts and goods for sale are simultaneously displayed on a home shopping screen, the video segmentation unit 130 may segment show hosts and goods for sale and may generate segmentation videos placed at the center of the video by recognizing the objects having high importance as goods for sale according to the importance calculated for each of goods for sale and other peripheral products. In addition, the video segmentation unit 130 may generate a video including the show hosts in the home shopping screen as one segmentation video and may generate a video about the information of the products as another segmentation video.

Hereinafter, a process of converting horizontal videos 200 and 600 into vertical videos will be described.

Figure 2:
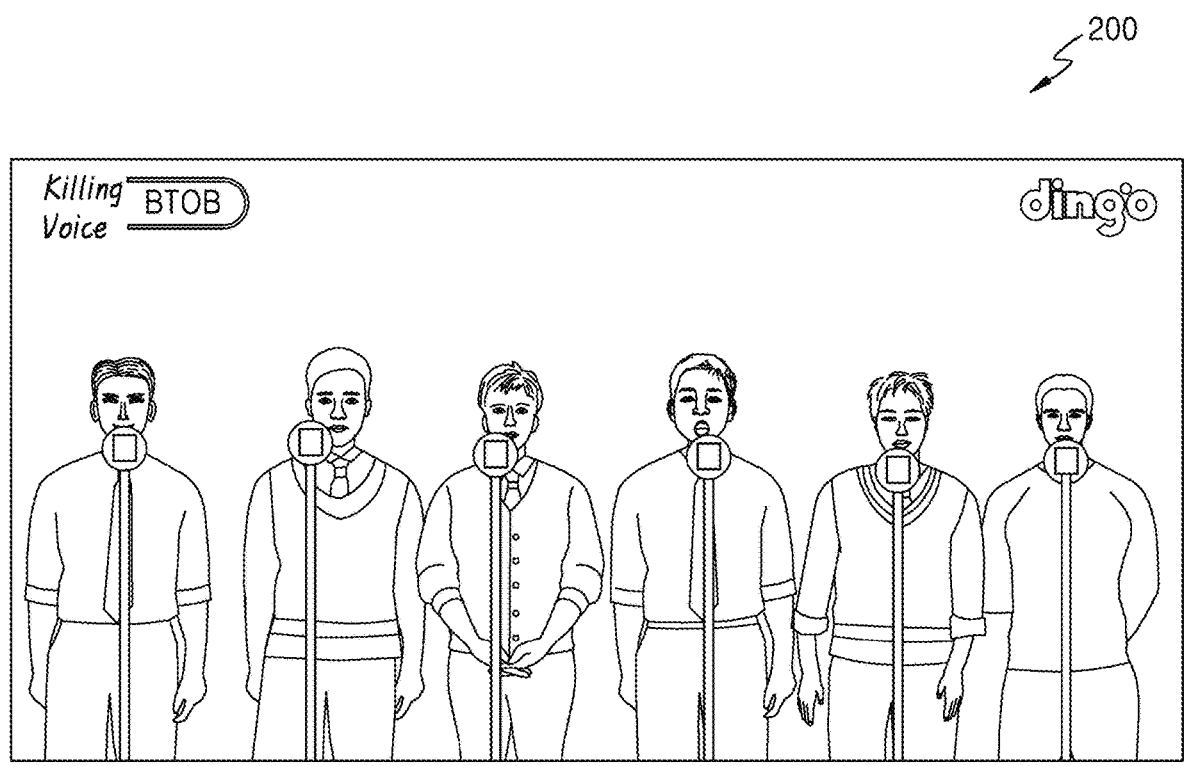
FIG. 2 illustrates an example of a horizontal video received in the apparatus for converting and transmitting horizontal and vertical videos based on machine learning of FIG. 1.
Figure 3:
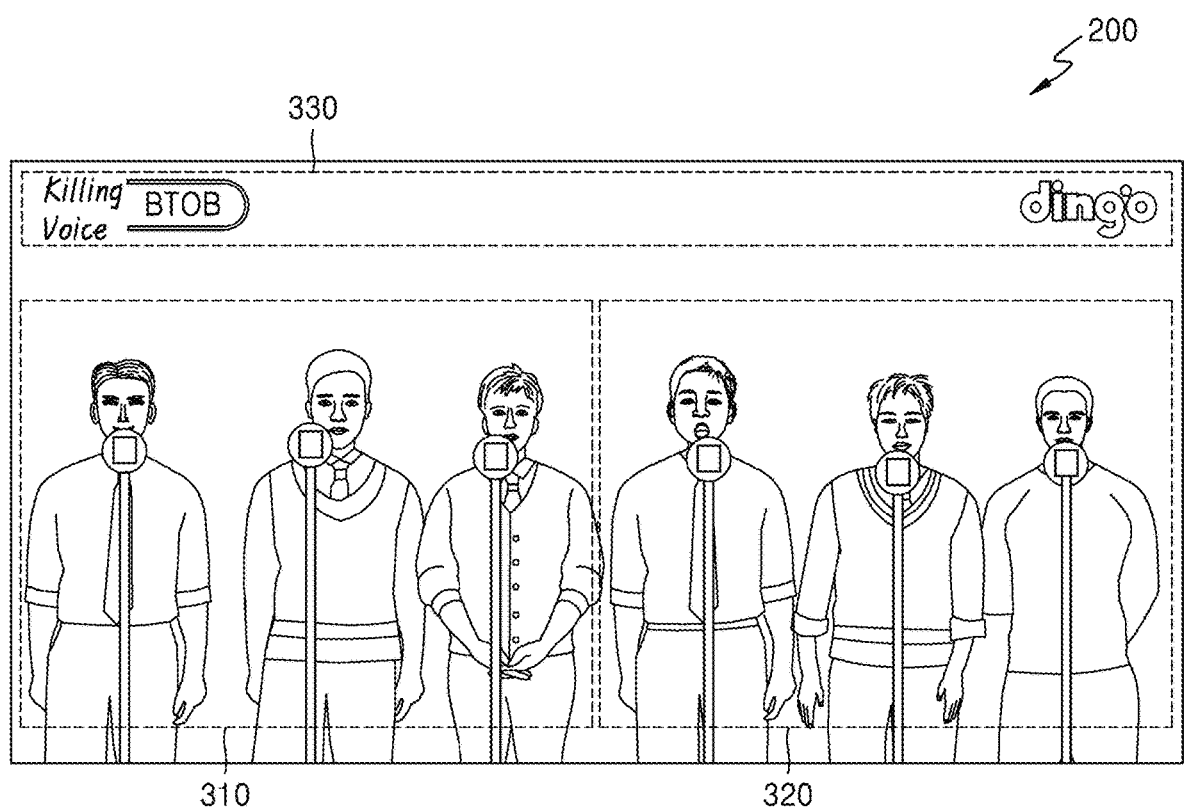
FIG. 3 illustrates a method of generating a vertical video after receiving the horizontal video of FIG. 2 in the apparatus for converting and transmitting horizontal and vertical videos based on machine learning of FIG. 1.
Figure 4:
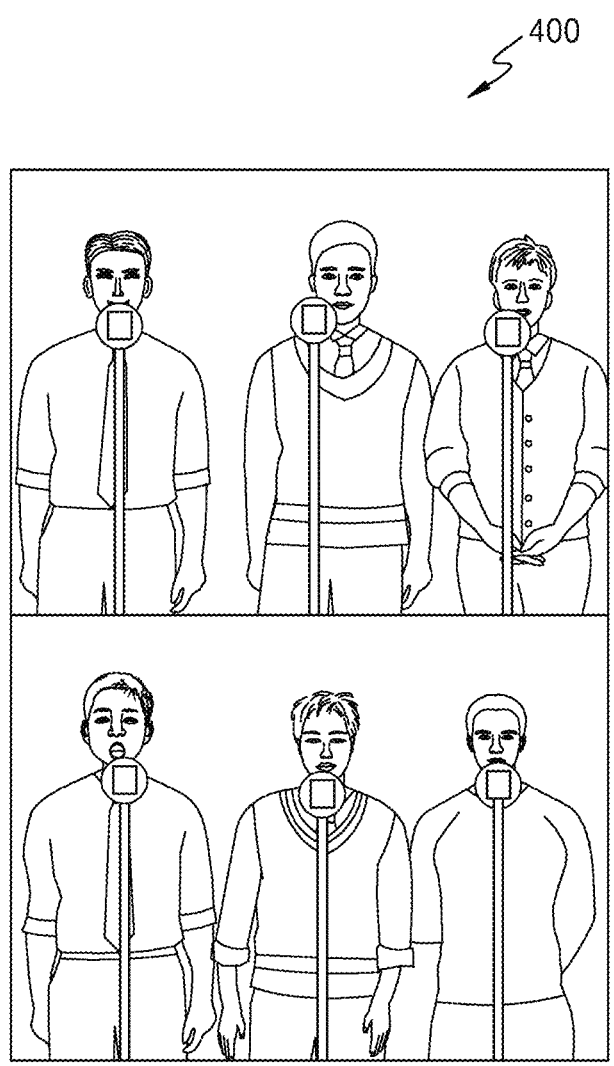
FIGS. 4 and 5 illustrate examples of vertical videos generated from the horizontal video of FIG. 2 by using the apparatus for converting and transmitting horizontal and vertical videos based on machine learning of FIG. 1.
Figure 5:
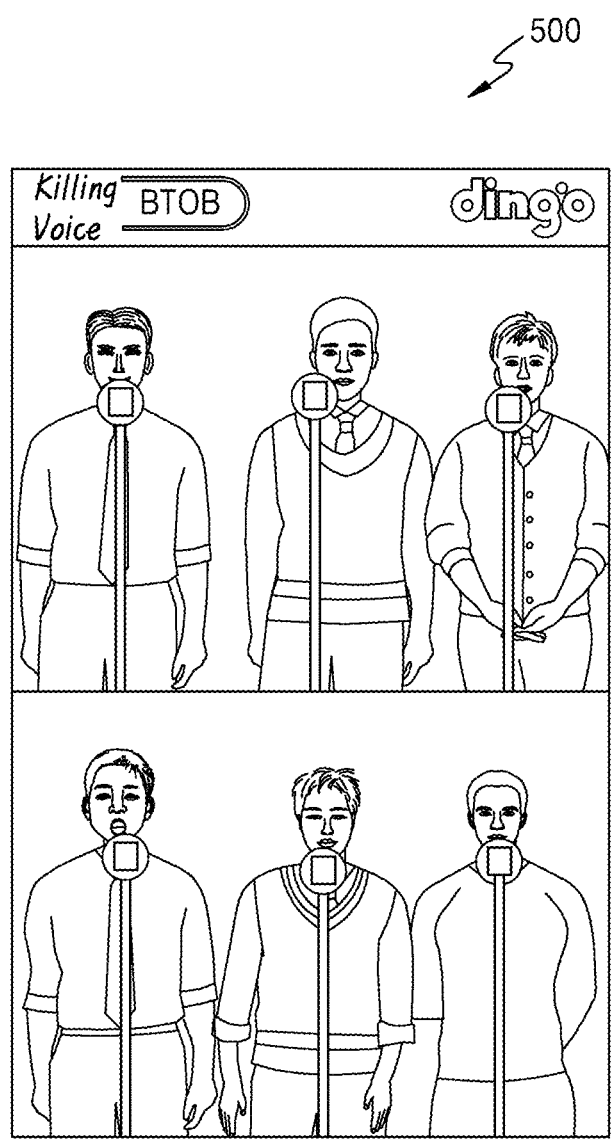

FIG. 2 illustrates an example of a horizontal video 200 received in the apparatus 100 for converting and transmitting horizontal and vertical videos based on machine learning of FIG. 1, FIG. 3 illustrates a method of generating a vertical video after receiving the horizontal video 200 of FIG. 2 in the apparatus 100 for converting and transmitting horizontal and vertical videos based on machine learning of FIG. 1, and FIGS. 4 and 5 illustrate examples of vertical videos 400 and 500 generated from the horizontal video 200 of FIG. 2 by using the apparatus 100 for converting and transmitting horizontal and vertical videos based on machine learning of FIG. 1.

Referring to FIGS. 1 through 4, when the receiver unit 110 receives the horizontal video 200 of FIG. 2, the object detection unit 120 may detect objects in the horizontal video 200 and the video segmentation unit 130 may generate a first segmentation video 310, a second segmentation video 320, and a third segmentation video 330 as illustrated in FIG. 3 by using the detected objects. The first segmentation video 310 includes three people on the left, the second segmentation video 320 includes three people on the right, and the third segmentation video 330 may be subtitles displayed on the upper part of the horizontal video 200. When the segmentation videos are generated as above, the video synthesis unit 140 may generate the vertical video 400 by arranging the segmentation video 310 and the second segmentation video 320 at the top and the bottom or may generate the vertical video 500 by arranging the segmentation video 310 and the second segmentation video 320 at the top and the bottom and overlapping the third segmentation video 330 on the upper part of the first segmentation video 310. Also, the transmission unit 150 may transmit the horizontal video 200 and the vertical videos 400 and 500 together or may transmit the horizontal video 200 or the vertical videos 400 and 500 to a viewer's terminal according to a request from the viewer's terminal.

Figure 6:
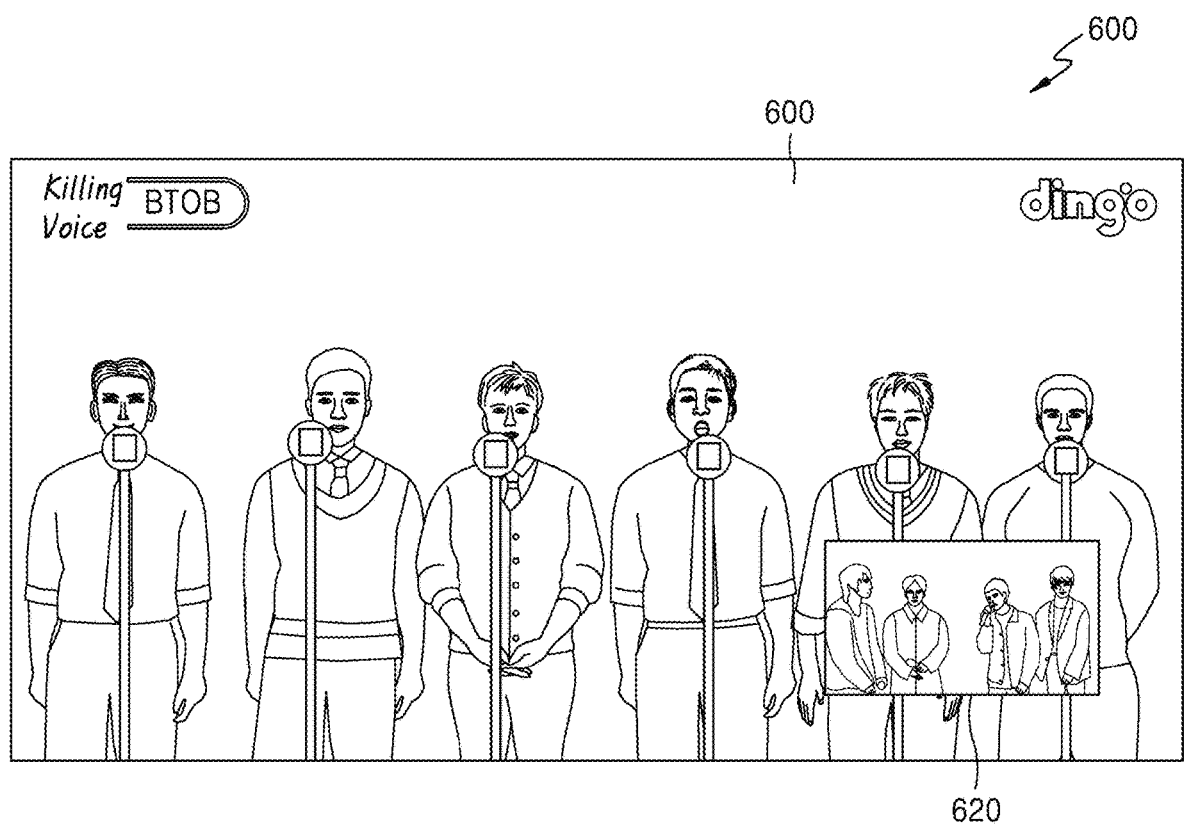
FIG. 6 illustrates another example of horizontal video received in the apparatus for converting and transmitting horizontal and vertical videos based on machine learning of FIG. 1.
Figure 7:
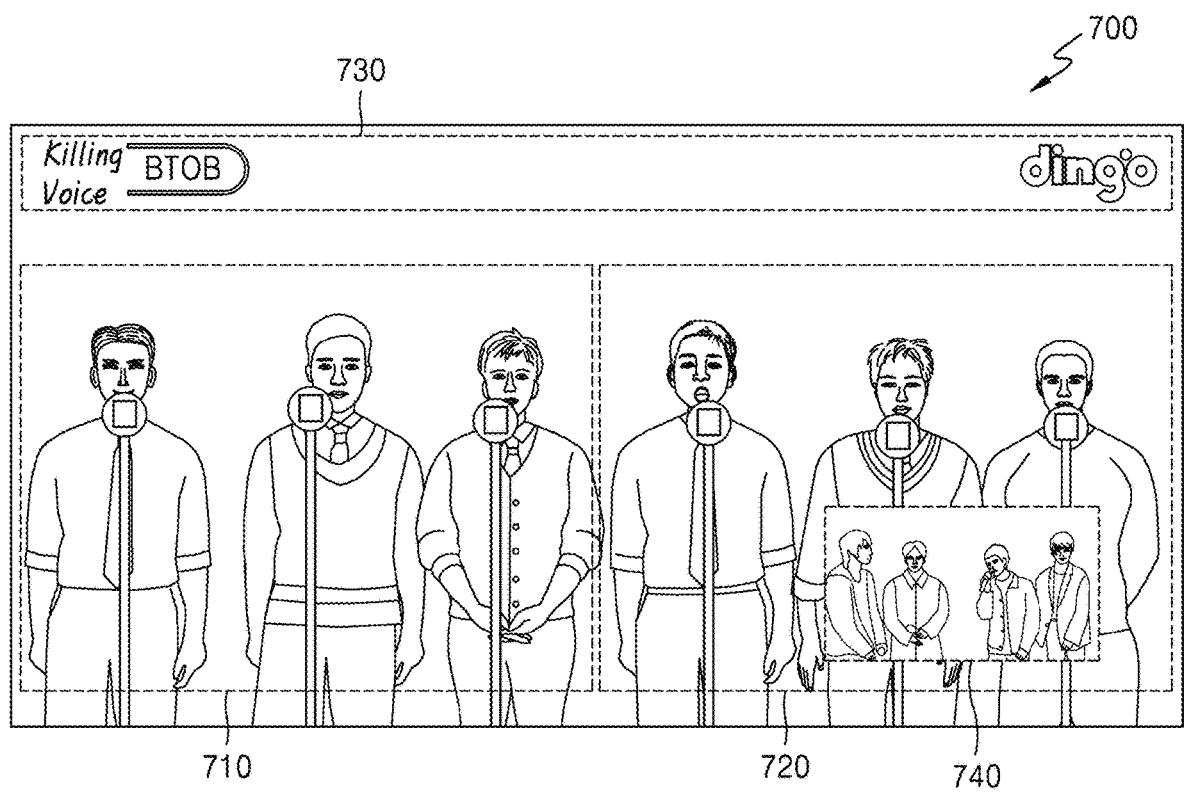
FIG. 7 illustrates a method of generating a vertical video after receiving the horizontal video of FIG. 6 in the apparatus for converting and transmitting horizontal and vertical videos based on machine learning of FIG. 1.
Figure 8:
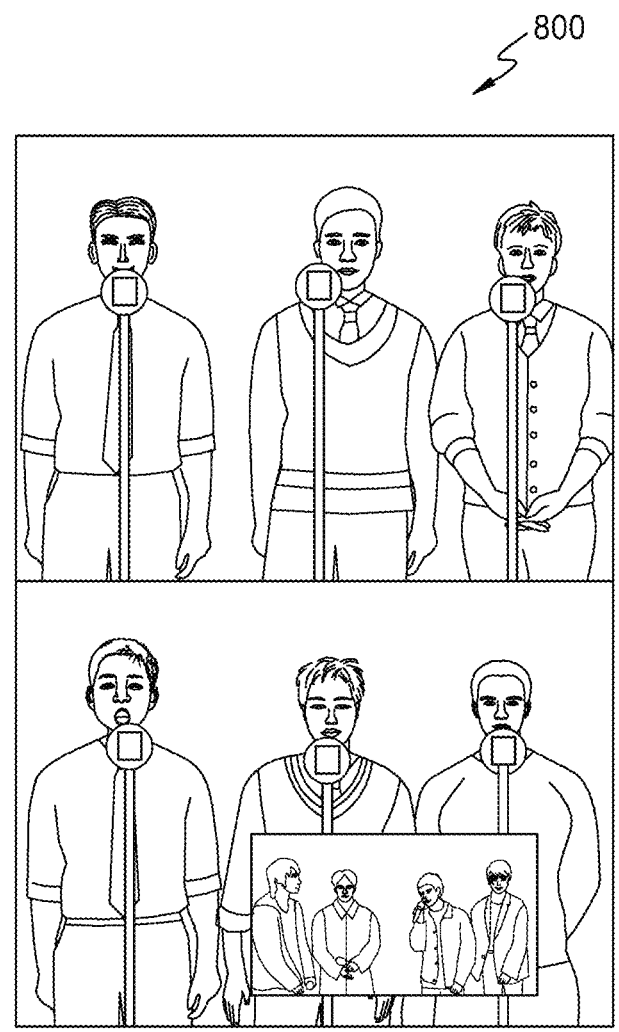
FIGS. 8 through 10 illustrate examples of vertical videos generated from the horizontal video of FIG. 6 by using the apparatus for converting and transmitting horizontal and vertical videos based on machine learning of FIG. 1.
Figure 9:
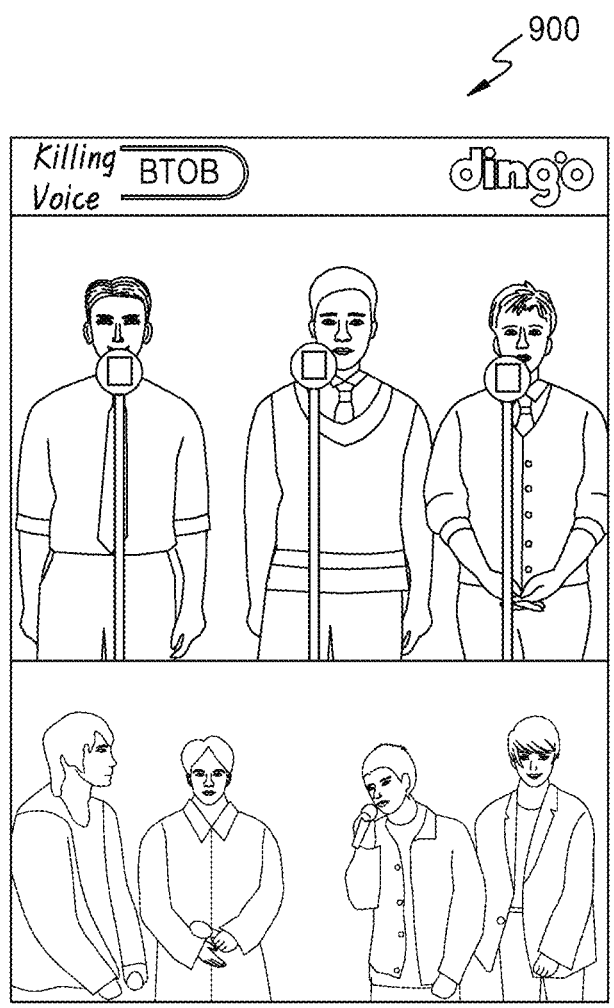
Figure 10:
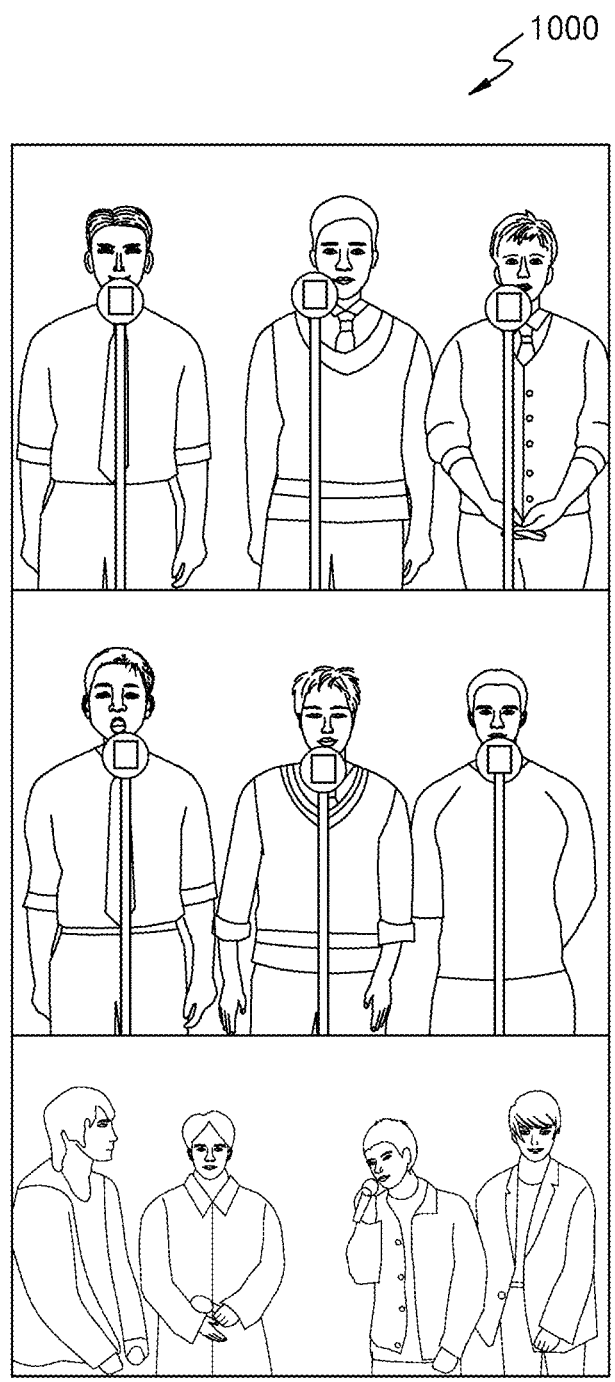

FIG. 6 illustrates another example of a horizontal video 600 received in the apparatus 100 for converting and transmitting horizontal and vertical videos based on machine learning of FIG. 1, FIG. 7 illustrates a method of generating a vertical video after receiving the horizontal video 600 of FIG. 6 in the apparatus 100 for converting and transmitting horizontal and vertical videos based on machine learning of FIG. 1, and FIGS. 8 through 10 illustrate examples of vertical videos 800, 900, 1000, and 1100 generated from the horizontal video 600 of FIG. 6 by using the apparatus 100 for converting and transmitting horizontal and vertical videos based on machine learning of FIG. 1.

Referring to FIGS. 1 through 10, when the receiver unit 110 receives the horizontal video 600 of FIG. 6, the object detection unit 120 may detect objects in the horizontal video 600. The video segmentation unit 130 may generate a first segmentation video 710 and a second segmentation video 720 as illustrated in FIG. 7 by using the detected objects and may generate a third segmentation video 730 and a fourth segmentation video 740 by using additional videos. The first segmentation video 710 includes three people on the left, the second segmentation video 720 includes three people on the right, the third segmentation video 730 may be subtitles which is the additional video, and the fourth segmentation video 740 may be the additional video displayed as a PIP in the horizontal video 600. When the segmentation videos are generated as above, the video synthesis unit 140 may generate the vertical video 800 by arranging the segmentation video 710 and the second segmentation video 720 at the top and the bottom and the fourth segmentation video 740 is added to the second segmentation video 720 as a PIP. As another example, the video synthesis unit 140 may generate the vertical video 900 by arranging the segmentation video 710 and the fourth segmentation video 740 at the top and the bottom and overlapping the third segmentation video 730 on the upper part of the first segmentation video 710. As another example, the video synthesis unit 140 may generate the vertical video 1000 by arranging the first segmentation video 710, the second segmentation video 720, and the fourth segmentation video 740 sequentially from the top to the bottom. Also, the transmission unit 150 may transmit the horizontal video 700 and the vertical videos 800, 900, or 1000 together or may transmit the horizontal video 700 or the vertical videos 800, 900, or 1000 to a viewer's terminal according to a request from the viewer's terminal.

Figure 11:
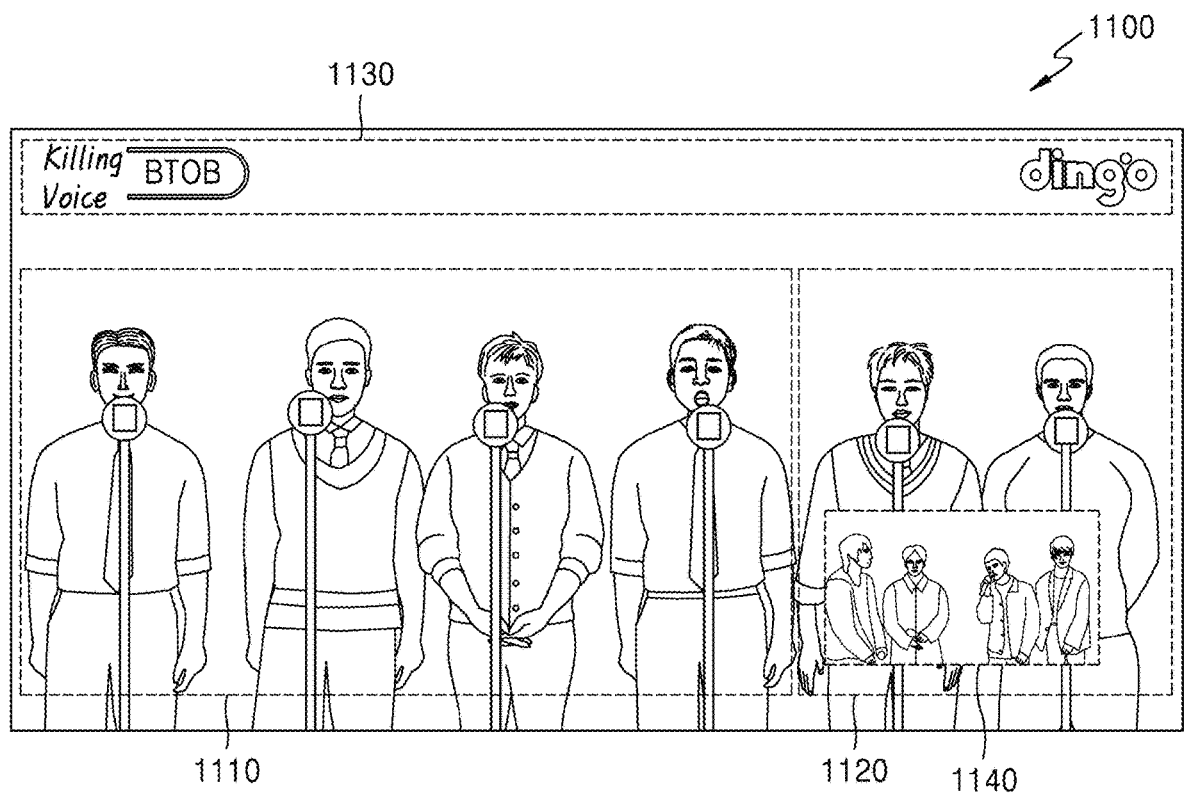
FIG. 11 illustrates another method of generating a vertical video after receiving the horizontal video of FIG. 6 in the apparatus for converting and transmitting horizontal and vertical videos based on machine learning of FIG. 1.
Figure 12:
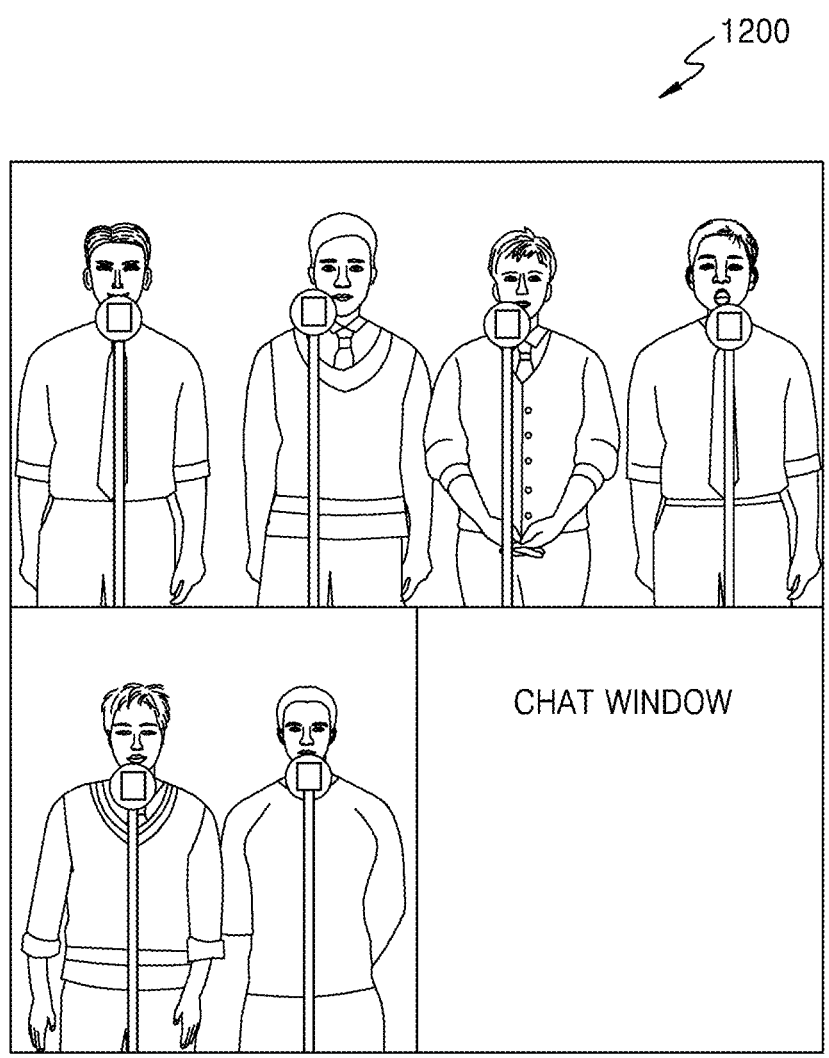
FIG. 12 illustrates an example of a vertical video generated from the horizontal video of FIG. 6 by using the apparatus for converting and transmitting horizontal and vertical videos based on machine learning of FIG. 1.

FIG. 11 illustrates another method of generating a vertical video after receiving the horizontal video 600 of FIG. 6 in the apparatus 100 for converting and transmitting horizontal and vertical videos based on machine learning of FIG. 1 and FIG. 12 illustrates an example of a vertical video 1200 generated from the horizontal video 600 of FIG. 6 by using the apparatus 100 for converting and transmitting horizontal and vertical videos based on machine learning of FIG. 1.

Referring to FIGS. 1 through 12, when the receiver unit 110 receives the horizontal video 600 of FIG. 6, the object detection unit 120 may detect objects in the horizontal video 600. The video segmentation unit 130 may generate a first segmentation video 1110 and a second segmentation video 1120 as illustrated in FIG. 11 by using the detected objects and may generate a third segmentation video 1130 and a fourth segmentation video 1140 by using additional videos. The first segmentation video 1110 includes four people on the left, the second segmentation video 1120 includes two people on the right, the third segmentation video 1130 may be subtitles which is the additional video, and the fourth segmentation video 1140 may be the additional video displayed as a PIP in the horizontal video 600. When the segmentation videos are generated as above, the video synthesis unit 140 may generate the vertical video 1200 in which the second segmentation video 1120 and the chat window that corresponds to the additional video are displayed together under the first segmentation video 1110. Also, the transmission unit 150 may transmit the horizontal video 600 and the vertical videos 1120 together or may transmit the horizontal video 600 or the vertical videos 1120 to a viewer's terminal according to a request from the viewer's terminal.

In the apparatus for converting and transmitting horizontal and vertical videos based on machine learning according to an embodiment of the present invention, the object recognition model learned by using machine learning is used to detect objects in a horizontal video, to segment videos, to arrange the segmentation video to fit the size of a vertical video, and to generate and transmit the vertical video. In this regard, if a smartphone is placed vertically, a viewer may watch a horizontal video that fully fills a screen. Also, in the apparatus for converting and transmitting horizontal and vertical videos based on machine learning according to an embodiment of the present invention, a horizontal video and a vertical video are simultaneously transmitted. In this regard, if a smartphone is placed vertically or horizontally, a viewer may watch the video that fully fills a screen. In addition, in the apparatus for converting and transmitting horizontal and vertical videos based on machine learning according to an embodiment of the present invention, a horizontal video may be segmented to generate one vertical video and additional videos such as subtitles, chat windows, or videos taken by another camera may be synthesized to segmented horizontal video to form a vertical video that fits the size of a vertical screen. Accordingly, various screen composition may be formed. Moreover, in the apparatus for converting and transmitting horizontal and vertical videos based on machine learning according to an embodiment of the present invention, the object recognition model learned by using machine learning calculates the importance of objects in consideration of the position or the size of the object arranged in the horizontal video and generates a segmentation position of the horizontal video according to the calculated importance of objects. Accordingly, the segmentation videos are generated and then, are synthesized to be a vertical video so that a screen of the objects having high importance may be enlarged or the objects having high importance may be placed at the best viewable position in the vertical video. In this regard, the vertical video may be generated to show the important part of the video well and thereby, user convenience may be improved.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An apparatus for converting and transmitting horizontal and vertical videos based on machine learning comprising:
   a receiver unit which receives a horizontal video taken by a camera from the camera;
   an object detection unit which detects objects in the received horizontal video by using an object recognition model learned by machine learning;
   a video segmentation unit which generates a plurality of segmentation videos by using the result detected from the object detection unit;
   a video synthesis unit which arranges the plurality of segmentation videos to fit the size of a screen of a vertical video and generates a vertical video,
   wherein the segmentation videos are videos segmented from the horizontal video including at least one object detected from the object detection unit, videos in which the additional videos are synthesized to videos segmented from the horizontal video to comprise at least one object detected from the object detection unit, or the additional videos,
   wherein the object detection unit calculates the importance of the object detected by using the object recognition model in consideration of the position or the size of the object arranged in the horizontal video and the video segmentation unit generates a segmentation position of the horizontal video according to the importance of objects calculated in the object detection unit and generates the segmentation videos.

2. The apparatus of claim 1, wherein the video segmentation unit segments a first segmentation video comprising a part of the plurality of objects in the horizontal video or the additional video and a second segmentation video comprising remaining objects in the horizontal video or the additional video and the video synthesis unit generates the vertical video by arranging the first segmentation video and the second segmentation video at the top and the bottom.

3. The apparatus of claim 1, wherein the additional videos comprise subtitles or chat windows inserted into the horizontal video, a Picture In Picture (PIP) videos displayed along with the horizontal video, videos taken by a camera other than the camera that transmits the horizontal video, or videos previously stored in a storage space.

4. The apparatus of claim 1, wherein the object recognition model is a model learned through machine learning to recognize people or things in the horizontal video as objects and to distinguish and recognize backgrounds and the objects.

5. The apparatus of claim 1, further comprising a transmission unit which simultaneously transmits the horizontal video and the vertical video to a viewer's terminal so as to display one of the horizontal video and the vertical video on a screen of the viewer's terminal or transmits the horizontal video or the vertical video to a viewer's terminal in response to a selection signal received from the viewer's terminal.

* * * * *